United States Patent
Tao (10) Patent No.: US 10,225,895 B2
(45) Date of Patent: Mar. 5, 2019

(54) DRIVING A LIGHT SOURCE VIA DIFFERENT MODES

(71) Applicant: PHILIPS LIGHTING HOLDING B.V., Eindhoven (NL)

(72) Inventor: Haimin Tao, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/326,257

(22) PCT Filed: Jul. 15, 2015

(86) PCT No.: PCT/EP2015/066199
§ 371 (c)(1),
(2) Date: Jan. 13, 2017

(87) PCT Pub. No.: WO2016/008943
PCT Pub. Date: Jan. 21, 2016

(65) Prior Publication Data
US 2017/0202064 A1    Jul. 13, 2017

(30) Foreign Application Priority Data
Jul. 17, 2014  (EP) ................................. 14177356

(51) Int. Cl.
*H05B 33/08*  (2006.01)
*H05B 37/02*  (2006.01)

(52) U.S. Cl.
CPC ..... *H05B 33/0815* (2013.01); *H05B 33/0842* (2013.01); *H05B 37/0281* (2013.01); *Y02B 20/346* (2013.01); *Y02B 20/383* (2013.01)

(58) Field of Classification Search
CPC ............ H05B 33/0815; H05B 33/0842; H05B 37/0281
See application file for complete search history.

(56) References Cited

U.S. PATENT DOCUMENTS

| 6,936,968 B2 | 8/2005 | Cross et al. |
| 2006/0082316 A1* | 4/2006 | Yahagi ................ F02N 11/0862 315/73 |

(Continued)

FOREIGN PATENT DOCUMENTS

| EP | 2381742 A2 | 10/2011 |
| EP | 2701461 A1 | 2/2014 |

(Continued)

*Primary Examiner* — Dedei K Hammond
*Assistant Examiner* — Raymond R Chai
(74) *Attorney, Agent, or Firm* — Akarsh P. Belagodu (57) ABSTRACT

Devices (1) for driving light sources (5) comprise drivers (2) operable in different modes and controllers (3) for, in response to detections of values of input voltages supplied to the devices (1), bringing the drivers (2) in one of the different modes. Such devices (1) can be used solely and in series and parallel combinations. In case the value of the input voltage is smaller/larger than a threshold value, a first/second mode is selected. The first mode is a preset-mode, the second mode is a feedback-mode. A combination of the light source (5) and the driver (2) may show a constant-resistor-load-behavior in the preset-mode. The device (2) may comprise a switch (25) that in the preset-mode is operated at a constant conducting time and that in the feedback-mode is operated in response to feedback-information derived from the light source (5). At start-up, the driver (2) may be kept deactivated during a time-interval.

11 Claims, 6 Drawing Sheets

(56) References Cited

U.S. PATENT DOCUMENTS

| | | | |
|---|---|---|---|
| 2010/0264827 A1 | 10/2010 | Huang et al. | |
| 2011/0194315 A1* | 8/2011 | Gaknoki | H02M 3/33507 363/21.17 |
| 2012/0043909 A1 | 2/2012 | Bloom et al. | |
| 2013/0034976 A1* | 2/2013 | Tonosaki | H01R 12/585 439/84 |
| 2013/0049615 A1 | 2/2013 | Kim | |
| 2013/0200812 A1* | 8/2013 | Radermacher | H05B 33/0824 315/186 |
| 2013/0334976 A1* | 12/2013 | Lin | H05B 37/02 315/193 |
| 2015/0042230 A1* | 2/2015 | Arulandu | H05B 33/083 315/122 |

FOREIGN PATENT DOCUMENTS

| | | |
|---|---|---|
| EP | 2713678 A1 | 4/2014 |
| JP | 10162964 A | 6/1998 |
| WO | 2010069983 A1 | 6/2010 |
| WO | 2011117770 A1 | 9/2011 |
| WO | 2012156878 A1 | 11/2012 |
| WO | 2013136301 A2 | 9/2013 |
| WO | 2013171952 A1 | 11/2013 |

* cited by examiner

DRIVING A LIGHT SOURCE VIA DIFFERENT MODES

CROSS-REFERENCE TO PRIOR APPLICATIONS

This application is the U.S. National Phase application under 35 U.S.C. § 371 of International Application No. PCT/EP2015/066199, filed on Jul. 15, 2015, which claims the benefit of European Patent Application No. 14177356.4, filed on Jul. 17, 2014. These applications are hereby incorporated by reference herein.

FIELD OF THE INVENTION

The invention relates to a device for driving a light source. The invention further relates to a lamp comprising the device, and to a method for controlling a driver. Examples of such a device are drivers. Examples of such a lamp are retrofit tubes.

BACKGROUND OF THE INVENTION

WO 2010/069983 A1 discloses a light emitting diode system for retrofitting fluorescent lighting and discloses at its page 13 lines 9-12 that a problem might occur when two or more of such lamps are used in a series combination.

SUMMARY OF THE INVENTION

It is an object of the invention to provide an improved device. It is a further object of the invention to provide a lamp and an improved method.

According to a first aspect, a device is provided for driving a light source, the device comprising
  a driver for driving the light source, the driver being operable in different modes, including a first mode and a second mode, the first mode being a preset-mode and the second mode being a feedback-mode, and
  a controller, wherein
  the controller is configured to operate the driver in the first mode and in the second mode; and
  the controller is responsive to a detection of a value of an input voltage, that is supplied to the device, such that the driver is operated in the first mode in case the value of the input voltage is smaller than a threshold value, and the driver is operated in the second mode in case the value of the input voltage is larger than the threshold value.

A driver drives a light source. The driver is operable in different modes. An input voltage is supplied to the device. A controller detects a value of the input voltage and brings the driver into one of the different modes in response to a detection result.

In case two or more devices in a series combination are coupled to one and the same supply, in a prior art situation the drivers of the two or more devices may start reacting to each other. This may result in one of the devices lighting up and another one going out or staying off.

By having introduced a detection of a value of an input voltage, the device can distinguish between being placed in a series combination (lower value of the input voltage) and being used solely or in a parallel combination (higher value of the input voltage) and can react to the different situations by selecting a suitable mode for the driver.

As a result, the device can be used solely or in a series combination or in a parallel combination, without a person who is installing (a lamp comprising) the device needing to check the situation. This is a great improvement.

An embodiment of the device is defined by the different modes comprising a first mode and a second mode, the driver being brought into the first mode in case the value of the input voltage is smaller than a threshold value, and the driver being brought into the second mode in case the value of the input voltage is larger than the threshold value. The first mode may be suitable for devices used in a series combination, and the second mode may be suitable for devices used solely or in a parallel combination.

An embodiment of the device is defined by the first mode comprising a preset-mode and the second mode comprising a feedback-mode. In a series combination, the drivers of the devices may start reacting to each other, therefore the first mode should be a preset-mode, without using feedback information from the light source. The second mode may be a feedback-mode wherein feedback information from the light source is used.

An embodiment of the device is defined by a combination of the light source and the driver in the preset-mode showing a substantially constant-resistor-load-behavior. In a series combination, drivers, that in combinations with light sources show substantially constant-resistor-load-behaviors, will stay stable and will not react to each other.

An embodiment of the device is defined by the driver comprising a switch that in the preset-mode is operated at a constant conducting time and that in the feedback-mode is operated in response to feedback-information derived from the light source. In case a switch of a driver is operated at a constant conducting time, a combination of the driver and the light source will show a substantially constant-resistor-load-behavior.

An embodiment of the device is defined by the controller being configured to, at start-up, keep the driver de-activated during a time-interval. When, at start-up, keeping a driver de-activated, a value of an input voltage can be determined better.

An embodiment of the device is defined by the device further comprising
  a rectifier circuit for rectifying an alternating-current voltage into a direct-current voltage, the value of the input voltage being a value of the direct-current voltage. A supply may provide, possibly via an electromagnetic ballast, an alternating-current voltage that via a rectifier circuit can be rectified into a direct-current voltage.

An embodiment of the device is defined by the controller comprising a comparator circuit for comparing the value of the input voltage with a threshold value and for in response to a comparison result producing a first control signal defining the comparison result. A comparator circuit is a low cost, simple and robust solution for detecting a value of an input voltage.

An embodiment of the device is defined by the controller comprising a trigger circuit for in response to a presence of the input voltage producing a second control signal defining a time-interval from start-up during which the driver is to be kept de-activated. A trigger circuit is a low cost, simple and robust solution for at start-up defining a time-interval during which a driver is to be kept de-activated.

According to a second aspect, a lamp is provided comprising the device as defined above. The lamp may further comprise a light source. In a first mode the lamp is suitable to be used in a series combination with another lamp, and a second mode the lamp is suitable to be used solely or in a parallel combination with another lamp.

An embodiment of the lamp is defined by the light source comprising a light emitting diode circuit. A light emitting diode circuit comprises one or more light emitting diodes of whatever kind and in whatever combination.

An embodiment of the device is defined by the lamp being in the form of a retrofit tube.

According to a third aspect, a method is provided for controlling a driver for driving a light source, the driver being operable in different modes, including a first and a second mode, the method comprising a step of, in response to a detection of a value of an input voltage, that is supplied to the driver, bringing the driver in the first or the second mode, the driver being brought into the first mode in case the value of the input voltage is smaller than a threshold value, and the driver being brought into the second mode in case the value of the input voltage is larger than the threshold value, the first mode comprising a preset-mode and the second mode comprising a feedback-mode.

A basic idea is that a value of an input voltage may be used to determine a mode of a driver.

A problem to provide an improved device has been solved. A further advantage is that, in addition to the fact that a person who is installing the device or the lamp does not need to check the kind of connection, the device is low cost, simple and robust.

These and other aspects of the invention will be apparent from and elucidated with reference to the embodiments described hereinafter.

DETAILED DESCRIPTION OF EMBODIMENTS

Figure 1:
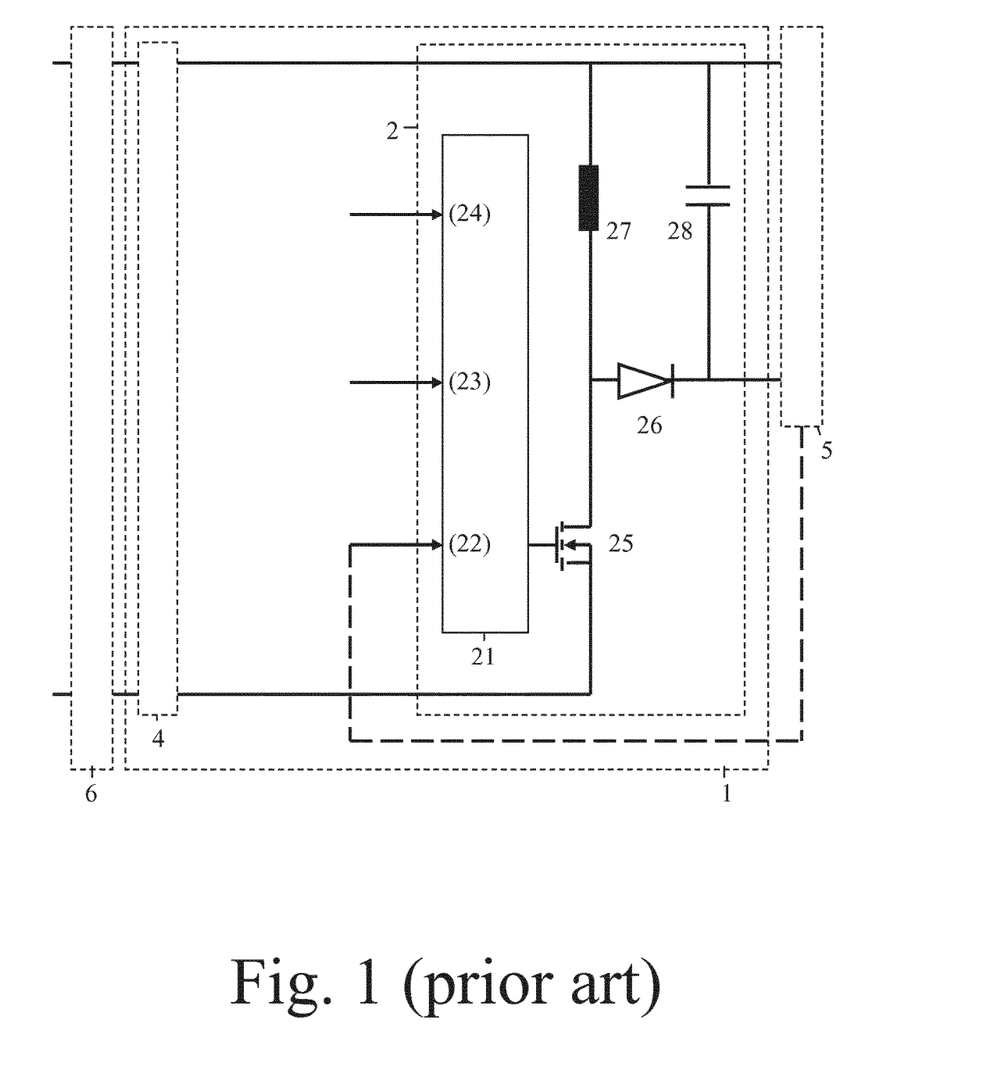
FIG. 1 shows a prior art situation.

In the FIG. 1, a prior art situation is shown. The device 1 comprises a driver 2 and a rectifier circuit 4. Inputs of the rectifier circuit 4 are coupled to outputs of an optional EMI filter 6 (electromagnetic interference filter). Outputs of the rectifier circuit 4 are coupled to inputs of the driver 2. Outputs of the driver 2 are coupled to terminals of a light source 5.

The driver 2 comprises an interface 21 with a first input 22 for receiving a feedback-signal carrying feedback-information from the light source 5. This feedback-information may for example define a value of an amplitude of a current flowing through (a part of) the light source 5 or may for example define a value of an intensity of light coming from (a part of) the light source 5. The interface 21 derives/calculates from this feedback-information a value of a conducting time of a switch of the driver 2 at which conducting time a converter 25-28 is to be operated. Alternatively, the interface 21 may derive/calculate from this feedback-information a value of a duty cycle or a value of a frequency or a value of a peak current to be delivered or a value of an amount of power to be delivered etc. for example in case other kinds of converters are used.

An output of the interface 21 is coupled to a control electrode of a switch 25 here in the form of a transistor. This switch 25 is conducting during a conducting time (on-time) and is non-conducting during a following non-conducting time (off-time). A duty cycle is defined by a combination of the conducting time and the non-conducting time. A first main electrode of the switch 25 is coupled via an inductor 27 to a first input and a first output of the driver 2, and a second main electrode of the switch 25 is coupled to a second input of the driver 2. The first main electrode of the switch 25 is further coupled via a diode 26 to a second output of the driver 2. Between the first and second outputs of the driver 2, a capacitor 28 is present. The components 25-28 form a buck-boost converter, but other kinds of converters are not to be excluded.

The interface 21 further comprises a second input 23 for receiving a parameter-signal carrying parameter-information and a third input 24 for receiving an on-off-signal carrying on-off-information.

The driver 2 can be operated in different modes. In a first mode such as for example a preset-mode, the driver 2 is operated in response to the parameter-information, such as a fixed value of a conducting time or a fixed value of a duty cycle or a fixed value of a frequency or a fixed value of a peak current to be delivered or a fixed value of an amount of power to be delivered etc. and the feedback-information is ignored. In a second mode such as for example a feedback-mode, the parameter-information is ignored and the feedback-information is used for operating the driver 2. So, here in the FIG. 1, the driver 2 is operated in the feedback-mode.

Figure 4:
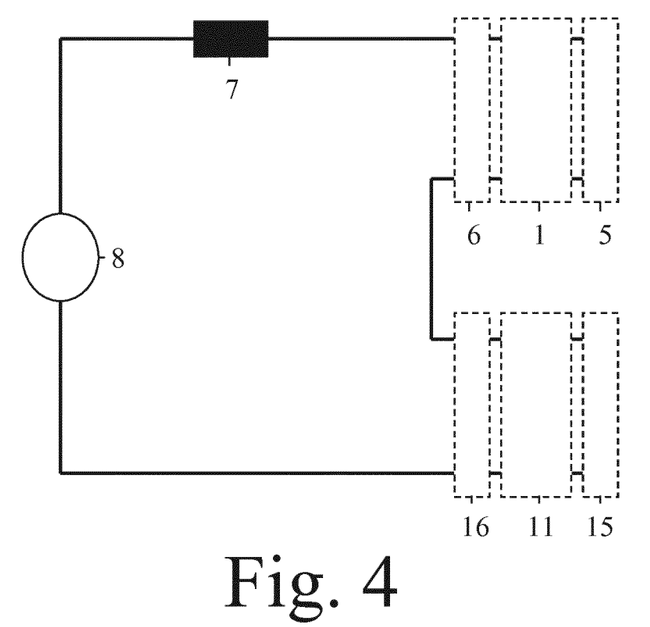
FIG. 4 shows two serial lamps fed via a ballast.
Figure 5:
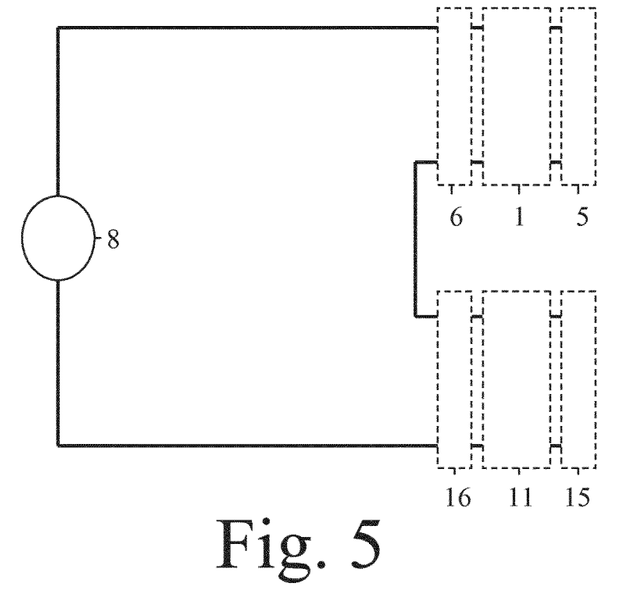
FIG. 5 shows two serial lamps without a ballast.
Figure 6:
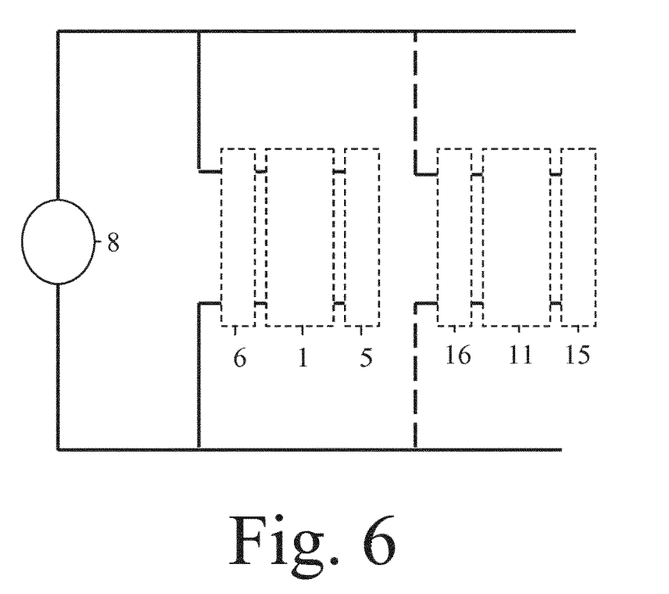
FIG. 6 shows one lamp and two parallel lamps without a ballast.

In case two or more lamps each comprising a driver and a light source are coupled serially to each other and to one and the same supply as shown in and discussed for the FIG. 4-6, a problem might occur, in that both drivers may start reacting to each other. To solve this problem, the device has been improved by having added a controller, as shown in and discussed for the FIG. 2.

Figure 2:
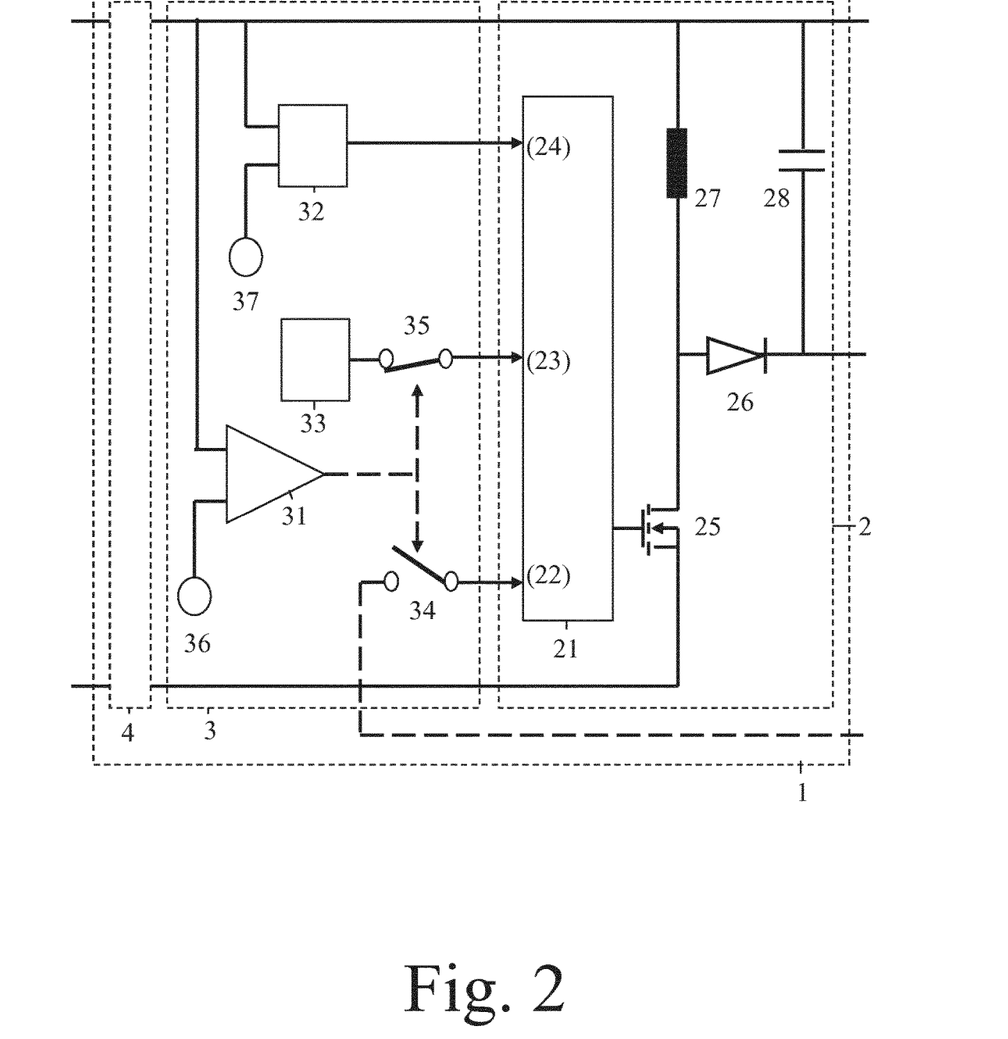
FIG. 2 shows an embodiment of a device.

In the FIG. 2, an embodiment of a device 1 is shown. For the sake of clarity, the optional EMI filter 6 and the light source 5 have been left out. The device 1 comprises the driver 2 already shown in and discussed for the FIG. 1 and further comprises a controller 3 located between the rectifier circuit 4 and the driver 2. The controller 3 may comprise a comparator circuit 31 having a first input coupled to a first output of the rectifier circuit 4 and having a second input coupled to a first source 36 for comparing a value of a direct-current voltage as supplied by the rectifier circuit 4 with a first threshold value and for in response to a comparison result producing a first control signal defining the comparison result. The first control signal is for example used for controlling a first switch 34 and a second switch 35.

In case the value of the direct-current voltage as supplied by the rectifier circuit 4 is smaller than the first threshold value as provided by the first source 36, the device 1 forms probably part of a series combination as shown in and discussed for the FIG. 4. In that case, the driver 2 should be operated in the preset-mode, and the second switch 35 is brought into a conducting mode, and the parameter-signal as for example generated by a generator 33 is provided to the second input 23 of the interface 21. At the same time, the first switch 34 is brought into a non-conducting mode, and the feedback-signal cannot reach the first input 22 of the interface 21.

In case the value of the direct-current voltage as supplied by the rectifier circuit 4 is larger than the first threshold value as provided by the first source 36, the device 1 is probably solely used or forms probably part of a parallel combination. In that case, the driver 2 can be operated in the feedback-mode, and the first switch 34 is brought into a conducting mode, and the feedback-signal is provided to the first input 22 of the interface 21. At the same time, the second switch 35 is brought into a non-conducting mode, and the parameter-signal as for example generated by a generator 33 cannot reach the second input 23 of the interface 21.

In case the value of the direct-current voltage as supplied by the rectifier circuit 4 is equal to the first threshold value as provided by the first source 36, one of both options may be chosen. Instead of using the switches 34 and 35, it might be possible to activate and de-activate the inputs 22 and 23, or to activate and de-activate the feedback-signal and the parameter-signal.

The controller 3 may further comprise a trigger circuit 32 for in response to a presence of the direct-current voltage as supplied by the rectifier circuit 4 producing a second control signal defining a time-interval from start-up during which the driver 2 is to be kept de-activated. Thereto, the trigger circuit 32 for example compares a value of a voltage of a serial-resistor-capacitor-network with a second threshold value as provided by the second source 37 and produces an on-signal as soon as the voltage across the capacitor of the serial-resistor-capacitor-network has exceeded the second threshold value. So, at start-up, the driver 2 is kept de-activated during a time-interval such as for example 100 msec. or 200 msec. or 500 msec. etc. to give the comparator circuit 31 time to make a comparison and to select a mode for the driver 2.

Alternatively to the trigger circuit 32, a generator may be used for at start-up generating an off-signal to be supplied to the third input 24 of the interface 21, with the comparator circuit 31 as soon as being ready providing an on-signal to be supplied to the third input 24 of the interface 21 and overruling the off-signal.

So, the device 1 comprises a driver 2 for driving a light source 5, which driver 2 is operable in different modes, and comprises a controller 3 for, in response to a detection of a value of an input voltage, that is supplied to the device 1 possibly via an electromagnetic ballast, bringing the driver 2 in one of the different modes. The different modes may for example comprise a first mode and a second mode. The driver 2 may be brought into the first mode in case the value of the input voltage is smaller than a threshold value. The driver 2 may be brought into the second mode in case the value of the input voltage is larger than a threshold value. The first mode may comprise a preset-mode and the second mode may comprise a feedback-mode.

The device 1 may further comprise a rectifier circuit 4 for rectifying an alternating-current voltage into a direct-current voltage. In that case, the value of the input voltage may be a value of the direct-current voltage. However, alternatively, the rectifier circuit 4 may be left out, for example in case the driver 2 has an in-built rectifier circuit or in case the driver 2 can handle an alternating-current voltage. Similarly, the controller 3 may have an in-built rectifier circuit or the controller 3 may be able to handle an alternating-current voltage.

Figure 3:
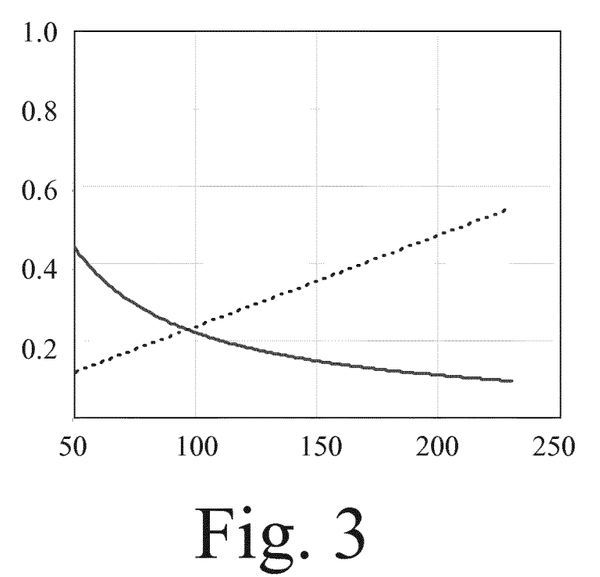
FIG. 3 shows a characteristic.

In the FIG. 3, a characteristic is shown (horizontal axis Volt, vertical axis Ampére) of a combination of a driver 2 and a light source 5 comprising a light emitting diode circuit when showing a substantially constant-resistor-load-behavior (dotted line) and a substantially constant-power-load-behavior (solid line). Clearly, for two or more lamps in a series combination, the substantially constant-resistor-load-behavior is to be preferred. This behavior is realized by operating the driver 2 at a fixed value of a conducting time while ignoring the feedback-information. In case only one lamp is used or two or more lamps are used in a parallel combination, the substantially constant-power-load-behavior or a substantially constant-current-load-behavior is to be preferred. This behavior is realized by operating the driver 2 in response to the feedback-information.

In the FIG. 4, two serial lamps are shown fed via a ballast. A first lamp comprises a first EMI filter 6, a first device 1 and a first light source 5 as discussed for the FIGS. 1-3, and a second lamp comprises a second EMI filter 16, a second device 11 and a second light source 15 in line with the first ones. Both lamps are coupled serially to each other and the serial combination is coupled via an electromagnetic ballast 7 to a supply 8 such as mains.

In the FIG. 5, two serial lamps without a ballast are shown. A first lamp comprises a first EMI filter 6, a first device 1 and a first light source 5 as discussed for the FIGS. 1-3, and a second lamp comprises a second EMI filter 16, a second device 11 and a second light source 15 in line with the first ones. Both lamps are coupled serially to each other and the serial combination is coupled to a supply 8 such as mains, without an electromagnetic ballast being present. Alternatively, such an electromagnetic ballast may be added.

In the FIG. 6, one lamp and two parallel lamps without a ballast are shown. A first lamp comprises a first EMI filter 6, a first device 1 and a first light source 5 as discussed for the FIGS. 1-3, and a second lamp comprises a second EMI filter 16, a second device 11 and a second light source 15 in line with the first ones. In case the second lamp is not present, the first lamp is coupled to a supply 8 such as mains, without an electromagnetic ballast being present. Alternatively, such an electromagnetic ballast may be added. In case both lamps are present, they are coupled in parallel to each other and the parallel combination is coupled to a supply 8 such as mains, without an electromagnetic ballast being present. Alternatively, such an electromagnetic ballast may be added.

Figure 7:
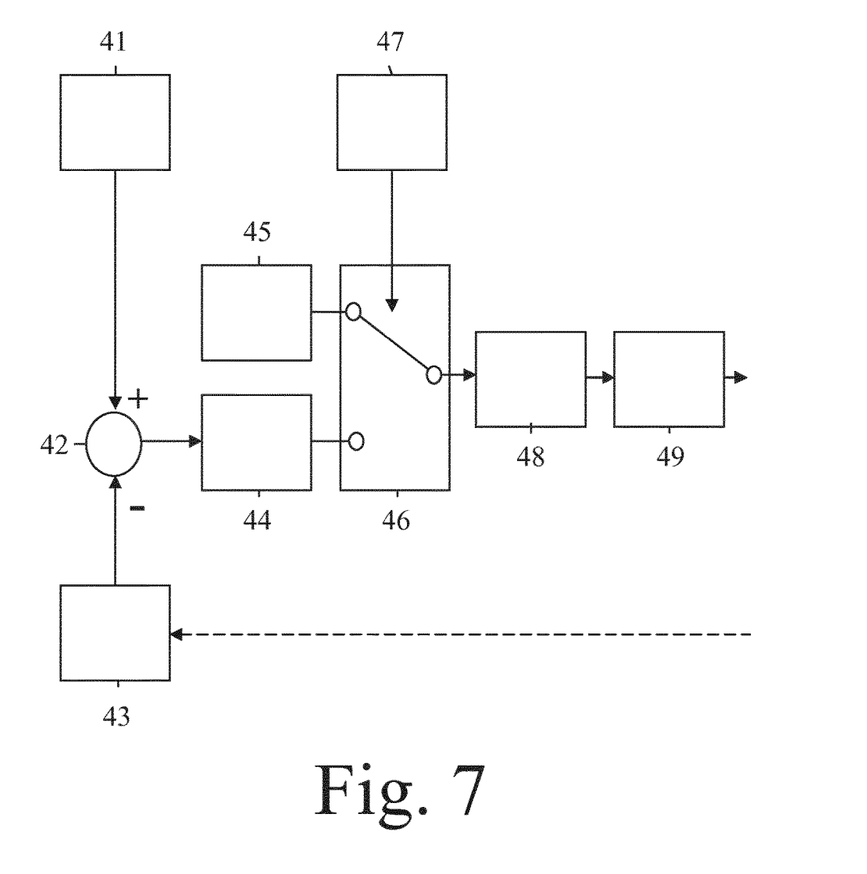
FIG. 7 shows an alternative solution.

In the FIG. 7, an alternative solution is shown. A low pass filter 43 receives the feedback-signal from the light source 5, such as a value of a current flowing through the light source 5, and low pass filters it. A generator 41 produces a reference value, and a subtracter 42 subtracts the filtered value from the reference value and supplies a difference value to a compensator 44. The compensator 44 supplies a compensated difference value to a first main contact of a third switch 46. This compensated difference value is to be used in the feedback-mode. A second main contact of the third switch 46 receives the fixed value of the conducting time to be used in the preset-mode from a generator 45. A detector 47 controls the third switch 46 in response to a detection of a value of the input voltage supplied to the device possibly via the electromagnetic ballast. A modulator 48 uses the compensated difference value or the fixed value to calculate a pulse width modulation signal and a driving circuit 49 converts this pulse width modulation signal into a driving signal destined for a control electrode of the switch 25.

In the FIG. 7, the parts 45-47 may form part of the controller 3, and the parts 48 and 49 may form part of the driver 2, with the parts 41-44 for example being external parts. Alternatively, the parts 41-44, 46, 48 and 49 may form part of the driver 2, with the parts 45 and 47 forming part of the controller 3. Alternatively, only the part 47 may form part of the controller 3, with all other parts forming part of the driver 2. Alternatively, the entire controller 3 may form part of the driver 2. The controller 3 and the interface 21 may be partly or fully integrated.

Figure 8:
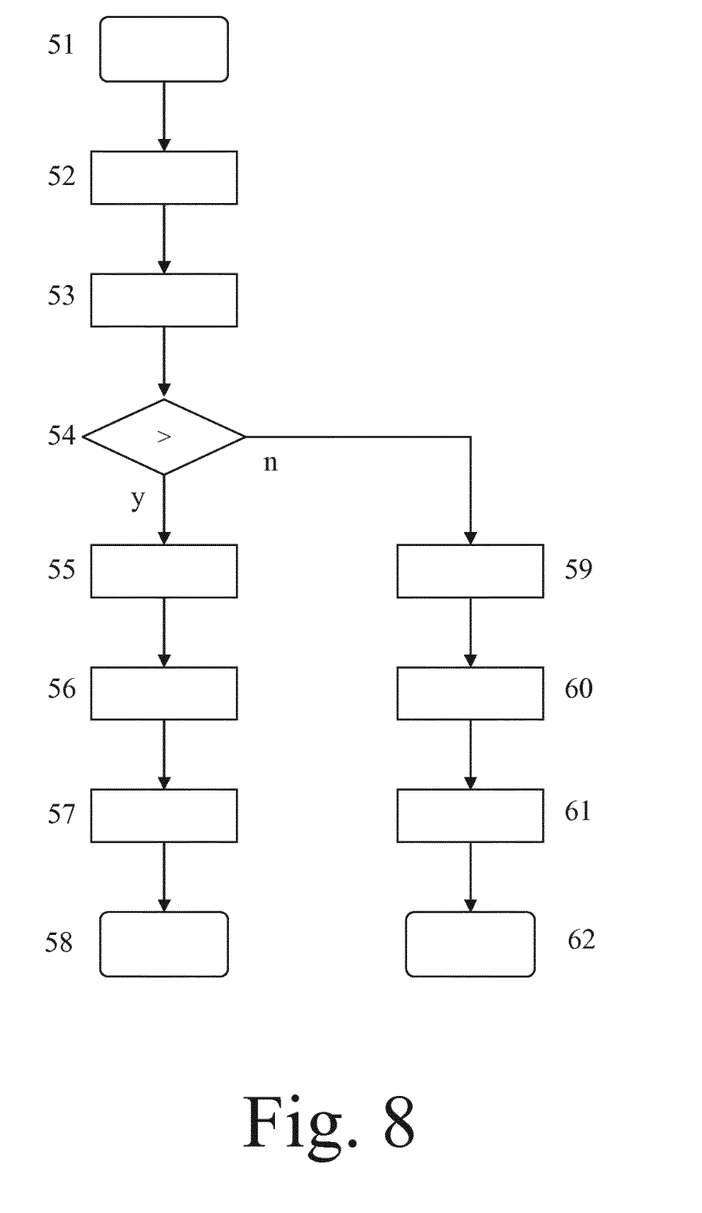
FIG. 8 shows a flow chart.

In the FIG. 8, a flow chart is shown, wherein the following blocks have the following meaning:

Block 51: Start.
Block 52: De-activate the driver.
Block 53: Detect a value of an input voltage.
Block 54: Compare the value of the input voltage with a threshold value. If larger, go to
block 55, if smaller, go to block 59.
Block 55: Select a feedback-mode for the driver.
Block 56: Activate the driver.
Block 57: Determine a value of a conducting time in response to a value of a current flowing through the light source.
Block 58: End, one lamp or parallel lamps in operation.
Block 59: Select a preset-mode for the driver.
Block 60: Activate the driver.
Block 61: Select a fixed value of a conducting time.
Block 62: End, serial lamps in operation.

First and second elements can be coupled directly without a third element being in between and can be coupled indirectly via the third element. Values of input voltages and values of direct-current voltages may be average values, root-mean-square values, peak values or other kinds of values.

Summarizing, devices 1 for driving light sources 5 comprise drivers 2 operable in different modes and controllers 3 for, in response to detections of values of input voltages supplied to the devices 1, bringing the drivers 2 in one of the different modes. Such devices 1 can be used solely and in series and parallel combinations. In case the value of the input voltage is smaller/larger than a threshold value, a first/second mode is selected. The first mode is a preset-mode, the second mode is a feedback-mode. A combination of the light source 5 and the driver 2 may show a constant-resistor-load-behavior in the preset-mode. The device 2 may comprise a switch 25 that in the preset-mode is operated at a constant conducting time and that in the feedback-mode is operated in response to feedback-information derived from the light source 5. At start-up, the driver 2 may be kept de-activated during a time-interval.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for driving a light source, the device comprising
a driver for driving the light source, the driver being operable in different modes, including a first mode and a second mode, the first mode being a preset-mode, without using feedback information from the light source and the second mode being a feedback-mode wherein feedback information from the light source is used, and
a controller configured to operate a first switch and a second switch, wherein the first switch, when conducting, directs parameter information to the driver such that the driver is operated in the preset-mode in accordance with the parameter information, wherein the second switch, when conducting, directs feedback information from the light source to the driver such that the driver is operated in the feedback mode in accordance with the feedback information; and
wherein the controller is responsive to a detection of a value of an input voltage supplied to the device, such that the first switch is brought into a conducting mode and the driver is operated in the first mode in case the value of the input voltage is smaller than a threshold value, the first mode being indicative of the device being placed in a series combination, and the second switch is brought into a conducting mode and the driver is operated in the second mode in case the value of the input voltage is larger than the threshold value, the second mode being indicative of the device being used solely or in a parallel combination.

2. The device as defined in claim 1, the driver comprising a switch that in the preset-mode is operated at a constant conducting time and that in the feedback-mode is operated as defined by feedback-information derived from the light source.

3. The device as defined in claim 1, the controller being configured to, at start-up, keep the driver de-activated during a time-interval.

4. The device as defined in claim 1, the device further comprising a rectifier circuit for rectifying an alternating-current voltage into a direct-current voltage, the value of the input voltage being a value of the direct-current voltage.

5. The device as defined in claim 1, the controller comprising a comparator circuit for comparing the value of the input voltage with a threshold value and for in response to a comparison result producing a first control signal defining the comparison result.

6. The device as defined in claim 1, the controller comprising a trigger circuit for in response to a presence of the input voltage producing a second control signal defining a time-interval from start-up during which the driver is to be kept de-activated.

7. A lamp comprising the light source and further comprising the device as defined in claim 1.

8. The lamp of claim 7, wherein in the preset-mode the light source and the driver show a substantially constant-resistor-load-behavior.

9. The lamp as defined in claim 7, the light source comprising a light emitting diode circuit.

10. The lamp as defined in claim 9, the lamp being in the form of a retrofit tube.

11. A method for controlling a driver for driving a light source, the driver being operable in different modes, including a first mode and a second mode, the method comprising a step of, in response to a detection of a value of an input voltage, that is supplied to the driver, bringing the driver in the first or the second mode, bringing a first switch into a conductive mode such that parameter information is directed to the driver and the driver is brought into the first mode in case the value of the input voltage is smaller than a threshold value, and bringing a second switch into a conductive mode such that feedback information from the light source is directed to the driver and the driver is brought into the second mode in case the value of the input voltage is larger than the threshold value, the first mode comprising a preset-mode, without using feedback information from the light source, the first mode further being indicative of the device being in a series combination, and the second mode comprising a feedback-mode, wherein feedback information from the light source is used, and the second mode further being indicative of the device being used solely or in a parallel combination.

* * * * *